US007525436B2

United States Patent
Mickle et al.

(10) Patent No.: US 7,525,436 B2
(45) Date of Patent: *Apr. 28, 2009

(54) METHODS AND APPARATUS FOR REDUCING POWER CONSUMPTION OF AN ACTIVE TRANSPONDER

(75) Inventors: Marlin H. Mickle, Pittsburgh, PA (US); Peter J. Hawrylak, Woodstown, NJ (US); Raymond R. Hoare, Pittsburgh, PA (US); Alex Jones, Pittsburgh, PA (US); James T. Cain, Pittsburgh, PA (US); Chuba Oyolu, Pittsburgh, PA (US); Shenchih Tung, Pittsburgh, PA (US)

(73) Assignee: University of Pittsburgh-Of the Commonwealth System of Higher Education, Pittsburgh, PA (US)

( * ) Notice: Subject to any disclaimer, the term of this patent is extended or adjusted under 35 U.S.C. 154(b) by 83 days.

This patent is subject to a terminal disclaimer.

(21) Appl. No.: 11/561,595

(22) Filed: Nov. 20, 2006

(65) Prior Publication Data

US 2007/0176752 A1    Aug. 2, 2007

Related U.S. Application Data

(63) Continuation-in-part of application No. 11/408,774, filed on Apr. 21, 2006, now Pat. No. 7,375,637.

(60) Provisional application No. 60/739,577, filed on Nov. 23, 2005, provisional application No. 60/673,715, filed on Apr. 21, 2005.

(51) Int. Cl.
*G08B 13/14*    (2006.01)
*H04Q 5/22*    (2006.01)

(52) U.S. Cl. ............... 340/572.1; 340/10.33; 340/10.34

(58) Field of Classification Search .............. 340/572.1, 340/7.32, 7.33, 7.36, 10.31, 10.32, 10.33, 340/10.34
See application file for complete search history.

(56) References Cited

U.S. PATENT DOCUMENTS

| 5,469,180 | A | | 11/1995 | Wiggenhorn |
| 5,621,412 | A | * | 4/1997 | Sharpe et al. ............ 340/10.33 |
| 6,127,799 | A | | 10/2000 | Krishnan |
| 6,249,226 | B1 | * | 6/2001 | Harrison et al. .......... 340/572.1 |
| 6,275,143 | B1 | * | 8/2001 | Stobbe .................... 340/10.34 |
| 6,282,407 | B1 | | 8/2001 | Vega et al. |
| 6,480,110 | B2 | | 11/2002 | Lee et al. |

(Continued)

*Primary Examiner*—John A Tweel, Jr.
(74) *Attorney, Agent, or Firm*—Eckert Seamans Cherin & Mellott, LLC; Philip E. Levy, Esq.

(57) ABSTRACT

A power management method for a transponder having a plurality of circuits including at least a first circuit having a first active state requiring at least a first power level, and a second circuit having a second active state requiring at least a second power level greater than the first power level includes receiving a reader device signal in the first circuit, determining in the first circuit, based on information included in the reader signal, whether the reader signal requires a circuit other than the first circuit to operate, and causing the first circuit to provide a wake-up signal and the reader signal to the second circuit if it is determined that the reader signal requires a circuit other than the first circuit to operate. The wake-up signal causes the second circuit to move from an inactive state to the second active state.

16 Claims, 7 Drawing Sheets

U.S. PATENT DOCUMENTS

| | | |
|---|---|---|
| 6,650,227 B1 | 11/2003 | Bradin |
| 6,697,030 B2 | 2/2004 | Gleener |
| 6,870,462 B1 * | 3/2005 | Andersson ............... 340/10.34 |
| 6,894,600 B2 * | 5/2005 | Phelan .................... 340/10.34 |
| 6,965,295 B2 * | 11/2005 | Shimonomoto et al. .. 340/10.34 |
| 7,019,617 B2 * | 3/2006 | Pratt et al. ............... 340/10.33 |
| 7,023,342 B2 | 4/2006 | Corbett et al. |
| 7,221,259 B2 * | 5/2007 | Cole ....................... 340/10.31 |
| 2003/0181229 A1 | 9/2003 | Forster et al. |
| 2005/0057341 A1 * | 3/2005 | Roesner ................... 340/10.33 |
| 2005/0083201 A1 | 4/2005 | Trosper |
| 2005/0120321 A1 | 6/2005 | Auracher et al. |
| 2005/0164633 A1 * | 7/2005 | Linjama et al. .......... 340/10.33 |
| 2006/0197653 A1 * | 9/2006 | Kung et al. .............. 340/10.34 |
| 2007/0096875 A1 * | 5/2007 | Waterhouse et al. ..... 340/10.34 |
| 2007/0103291 A1 * | 5/2007 | Adams .................... 340/572.8 |
| 2007/0176752 A1 * | 8/2007 | Mickle et al. ............ 340/10.33 |
| 2007/0205873 A1 * | 9/2007 | Mickle et al. ............ 340/10.33 |

* cited by examiner

METHODS AND APPARATUS FOR REDUCING POWER CONSUMPTION OF AN ACTIVE TRANSPONDER

CROSS-REFERENCE TO RELATED APPLICATION

This application is a continuation-in-part of U.S. application Ser. No. 11/408,774, entitled "Method And Apparatus For Reducing Power Consumption Of An Active Transponder," which was filed on Apr. 21, 2006 and is now U.S. Pat. No. 7,375,637, which application claims the benefit of U.S. Provisional Application No. 60/673,715, entitled "Method And Device For Reducing Power Consumption Of Active RFID Tags," which was filed on Apr. 21, 2005, the disclosures of which are incorporated herein by reference. This application also claims the benefit of U.S. Provisional Application No. 60/739,577, entitled "Active RFID Tag Power Optimization Architecture," which was filed on Nov. 23, 2005, the disclosure of which is incorporated herein by reference.

FIELD OF THE INVENTION

The present invention relates to transponders, such as RFID tags, and in particular to methods and apparatus for reducing the power consumed by active transponders.

BACKGROUND OF THE INVENTION

The use of radio frequency identification (RFID) systems is expanding rapidly in a wide range of application areas. RFID systems consist of a number of radio frequency tags or transponders (RFID tags) and one or more radio frequency readers or interrogators (RFID readers). The RFID tags include one or more integrated circuit (IC) chips, such as a complementary metal oxide semiconductor (CMOS) chip, and an antenna connected thereto for allowing the RFID tag to communicate with an RFID reader over an air interface by way of RF signals. In a typical RFID system, one or more RFID readers query the RFID tags for information stored on them, which can be, for example, identification numbers, user written data, or sensed data. RFID systems have thus been applied in many application areas to track, monitor, and manage items as they move between physical locations.

RFID tags can generally be categorized as either passive tags or active tags. Passive RFID tags do not have an internal power supply. Instead, the relatively small electrical current induced in the antenna of a passive RFID tag by the incoming RF signal from the RFID reader provides enough power for the IC chip or chips in the tag to power up and transmit a response. Most passive RFID tags generate signals by backscattering the carrier signal sent from the RFID reader. Thus, the antenna of a passive RFID tag has to be designed to both collect power from the incoming RF signal and transmit (or reflect, e.g., backscatter) the outbound backscatter signal. Due to power limitations, the ability to provide devices such as sensors or microprocessors on passive RFID tags is limited. Passive RFID tags do, however, have the advantage of a near unlimited lifetime as they obtain their power from the RF signal sent from the RFID reader.

Active RFID tags, on the other hand, have their own internal power source, such as, without limitation, a battery, a fuel cell or what is commonly known as a super capacitor. The internal power source is used to power the IC chip or chips and discrete circuit elements, which typically include an RF receiver, an RF transmitter, and some type of controller, such as a microcontroller or other processor, and any other electronics provided on the active RFID tag. As a result, active RFID tags can include relatively high power devices such as sensors, microprocessors, receivers and transmitters. Also, because of the on-board power, active RFID tags typically have longer ranges and larger memories than passive RFID tags. The internal power source, however, also means that active RFID tags typically have a lifetime that is limited by the lifetime of the power source. Thus, periodic maintenance is required.

As noted above, multiple active RFID tags may be used to track, monitor, and manage multiple items/assets as they move between physical locations. In such an application, each active RFID tag is affixed to an item/asset that is located in a particular location or environment, such as in a building. In current RFID systems, the active RFID tags, when deployed in such a manner, are done so in a state where (i) an RF receiver of the tag is in an active state for receiving RF signals, and (ii) the controller is in a low power inactive (sleep) state to preserve power. When one or more of the active RFID tags are to be queried, the RFID reader sends out a wake-up signal that is received by the RF receiver of each tag. Upon receipt of the signal, the RF receiver in each tag will then send a signal to the controller of the tag that causes it to move from the inactive state to an active (wake-up) state. For example, in RFID systems implemented according to the ISO 18000 Part 7 standard, when one or more tags are to be queried, the reader will send out a 30 KHz tone lasting for a period of approximately 2.5 seconds. Upon receipt of the tone, the RF receiver in each tag will wake-up the controller in the tag. The RFID reader then sends out signals intended for particular ones of the tags. Those particular tags for which the signals are intended will then perform the requested action, and the remaining tags (i.e., those tags not currently of interest to the reader) will move back to a sleep state. Alternatively, in some implementations both the RF receiver and the controller of each tag are in a constant active state when deployed, and therefore a wake-up signal is not required.

The multiple active RFID tag arrangements just described present at least two power management problems. First, each active RFID tag that is deployed is required to have at least one component in an active, relatively high power consuming state at all times. In the first described arrangement, an RF receiver of each tag is always "on" so that it can listen for the wake-up signal. In the second described arrangement, both the RF receiver and controller of each tag are always "on." Second, in the first described arrangement, when the RFID reader needs to query one or more particular tags, all of the tags that are deployed are woken up (for example, according to the ISO 18000, Part 7 standard), i.e., their controllers are caused to move to an active, relatively high power consuming state. Only when a particular tag determines that the query in question is not intended for it will it then move back to the sleep state. As will be appreciated, these problems result in unnecessary use of power from the power source (e.g., battery) of each tag, and therefore decreases the continuous uninterrupted operational lifetime of each tag by requiring periodic maintenance.

SUMMARY OF THE INVENTION

The invention relates to a transponder apparatus having an identifier associated therewith that includes a receiver for receiving an RF signal transmitted by an interrogator, a power source, such as a battery or supercapacitor, and a processing unit, such as a microprocessor, a microcontroller or a custom electronic device, that is operatively coupled to the power source. The processing unit is capable of being in an inactive, sleep state (low current draw) and an active state. The transponder apparatus also includes a buffer device that is in electronic communication with the receiver and with the processing unit. The buffer device is structured to: (i) receive an information signal based on the RF signal from the receiver, (ii) determine whether the information signal includes the identifier, and (iii) cause the processing unit to move from the inactive state to the active state and transmit at least a portion of the information signal to the processing unit only if it is determined that the information signal includes the identifier.

In one embodiment, the buffer device is operatively coupled to and powered by the power source. The buffer device in this embodiment may be in an active state at all times, or may be caused to move to an active state when the receiver receives the RF signal. Similarly, the receiver may be operatively coupled to and powered by the power source, and may be in an active state at all times. Alternatively, the buffer device and/or the receiver may be operatively coupled to and powered by an energy harvesting circuit that receives energy transmitted in space from a far-field source, such as the interrogator or a radio station, converts the received energy into a DC power signal, and provides the DC power signal to the buffer device and/or receiver.

In one embodiment, the transponder apparatus is one of a plurality of system transponder apparatuses in a transponder system, and the identifier is unique to the transponder apparatus in the system. In an alternative embodiment, the transponder apparatus is one of a plurality of system transponder apparatuses in a transponder system, and the identifier is common to a plurality of the system transponder apparatuses.

The invention also provides a method of moving a processing unit included in a transponder apparatus from an inactive, sleep state to an active state, wherein the transponder apparatus has an identifier associated therewith. The method includes steps of receiving an RF signal from an interrogator, converting the RF signal into an information signal, determining whether the information signal includes the identifier, and causing the processing unit to move from the inactive state to the active state and transmitting at least a portion of the information signal to the processing unit only if it is determined that the information signal includes the identifier.

It is an object of the invention to provide a transponder apparatus and associated method that reduces the power consumed by the transponder apparatus from, for example, a battery or other power source associated therewith.

It is a further object of the invention to provide a transponder apparatus and associated method that employs a processing unit that may be moved from an inactive (low current drawing) state to an active state.

It is still a further object of the invention to provide a transponder apparatus and associated method that employs a buffer device to determine whether to wake-up the associated processing unit based upon the receipt of an identifier associated with the transponder apparatus.

It is still a further object of the invention to provide a transponder apparatus and associated method that employs a buffer device to determine whether to wake-up the associated processing unit that is powered by the battery of the transponder apparatus.

It is still a further object of the invention to provide a transponder apparatus and associated method that employs a buffer device to determine whether to wake-up the associated processing unit that is powered by the battery of the transponder apparatus and that may be moved from an inactive state to an active state when it is necessary to determine whether the processing unit should be woken up.

It is still a further object of the invention to provide a transponder apparatus and associated method that employs a buffer device to determine whether to wake-up the associated processing unit that is powered by harvesting energy transmitted in space.

It is still a further object of the invention to provide a transponder apparatus and associated method that employs a receiver that is powered by harvesting energy transmitted in space.

Another embodiment of the invention provides a method of managing power consumption in a transponder having a plurality of circuits including at least a first circuit having a first active state requiring at least a first level of power, and a second circuit having a second active state requiring at least a second level of power, wherein the second level of power is greater than the first level of power. The method includes receiving a reader signal sent by a reader device in the first circuit, determining in the first circuit, based on information included in the reader signal, whether the reader signal requires one of the plurality of circuits other than the first circuit to operate, and causing the first circuit to provide a wake-up signal to the second circuit and causing the first circuit to provide the reader signal to the second circuit if it is determined that the reader signal requires one of the plurality of circuits other than the first circuit to operate. The wake-up signal causes the second circuit to move from an inactive state to the second active state.

In one particular embodiment, the plurality of circuits further includes a third circuit having a third active state requiring at least a third level of power, wherein the third level of power is greater than the second level of power. In this embodiment, the method further includes determining in the second circuit, based on the information included in the reader signal, whether the reader signal requires one of the plurality of circuits other than the second circuit to operate, and causing the second circuit to provide a second wake-up signal to the third circuit and causing the second circuit to provide the reader signal to the third circuit if it is determined that the reader signal requires one of the plurality of circuits other than the second circuit to operate. The second wake-up signal causes the third circuit to move from an inactive state to the third active state. The method may also further include causing the second circuit to move back to the inactive state after the step of causing the second circuit to provide a second wake-up signal to the third circuit and causing the second circuit to provide the reader signal to the third circuit.

Alternatively, the method may include receiving the reader signal in the third circuit, causing the third circuit to provide a second wake-up signal to the first circuit in response to receipt of the reader signal, the second wake-up signal causing the first circuit to move from an inactive state to the first active state, and causing the third circuit to provide the reader signal to the first circuit.

In still another embodiment, the invention provides a transponder apparatus that includes a plurality of circuits including at least a first circuit having a first active state requiring at least a first level of power, and a second circuit having a second active state requiring at least a second level of power, wherein the second level of power is greater than the first level of power. The first circuit is structured to: (i) receive a reader signal sent by a reader device, (ii) determine, based on information included in the reader signal, whether the reader signal requires one of the plurality of circuits other than the first circuit to operate, and (iii) provide a wake-up signal to the second circuit and provide the reader signal to the second circuit if it is determined that the reader signal requires one of the plurality of circuits other than the first circuit to operate, the wake-up signal causing the second circuit to move from an inactive state to the second active state. The plurality of circuits may further include a third circuit having a third active state requiring at least a third level of power, wherein the third level of power is greater than the second level of power, and wherein the second circuit is structured to: (i) determine, based on the information included in the reader signal, whether the reader signal requires one of the plurality of circuits other than the second circuit to operate, and (ii) provide a second wake-up signal to the third circuit and provide the reader signal to the third circuit if it is determined that the reader signal requires one of the plurality of circuits other than the second circuit to operate, the second wake-up signal causing the third circuit to move from an inactive state to the third active state. Alternatively, third circuit may be structured to: (i) receive the reader signal, (ii) provide a second wake-up signal to the first circuit in response to receipt of the reader signal, the second wake-up signal causing the first circuit to move from an inactive state to the first active state, and (iii) provide the reader signal to the first circuit.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DESCRIPTION OF THE PREFERRED EMBODIMENTS

Figure 1:
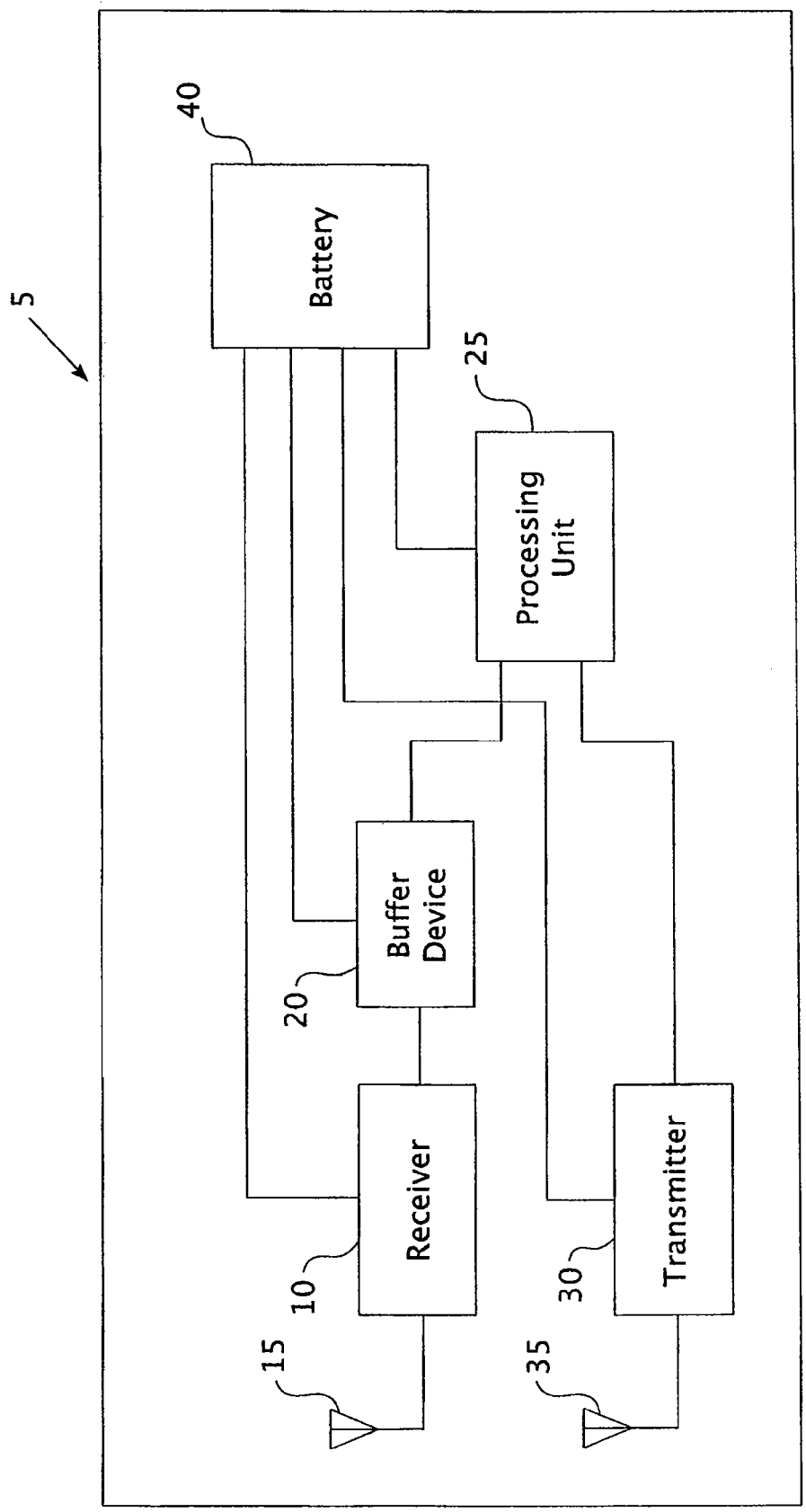
FIG. 1 is a block diagram of an RF transponder according to one embodiment of the present invention.

FIG. 1 is a block diagram of an RF transponder 5 according to one embodiment of the present invention. The RF transponder 5 includes a receiver 10 operatively coupled to an antenna 15. The receiver 10 may be any suitable RF receiver that is capable of demodulating an incoming RF signal such as, for example, the rfRXD0420 UHF ASK/FSK/FM receiver sold by Microchip Technology Inc. of Chandler Ariz. The receiver 10 is in electronic communication with a buffer device 20, the functionality of which is described in greater detail below. The buffer device 20 is in electronic communication with a processing unit 25, which may be, without limitation, a microprocessor, a microcontroller, or some other type of processor device. The processing unit 25 may further be another type of electronic device, such as a CMOS device or any other electronic circuit element provided on, for example, a semiconductor substrate or printed circuit board (PCB), which performs a particular function or functions. The processing unit 25 is capable of being placed into an inactive, sleep state where the current drawn by it is at a minimum. In addition, the processing unit 25 may be woken up, i.e., moved from the inactive, sleep state to an active state, upon receipt of an external input signal. An RF transmitter 30, such as the model rfPIC12F675F sold by Microchip Technology Inc. of Chandler Ariz. is in electronic communication with the processing unit 25. The RF transmitter 30 is, in response to commands received from the processing unit 25, able to transmit RF signals through an antenna 35 operatively coupled thereto. Like the processing unit 25, the RF transmitter 30 is capable of being placed into an inactive, sleep state where the current drawn by it is at a minimum, and can be woken up by receipt of an external input signal provided by the processing unit 25. The RF transponder 5 also includes a battery 40 which provides the power required for the operation of the receiver 10, the buffer device 20, the processing unit 25 and the transmitter 30. The battery 40 may alternatively be replaced by another power source, such as, without limitation, a fuel cell or a so called supercapacitor.

Figure 2:
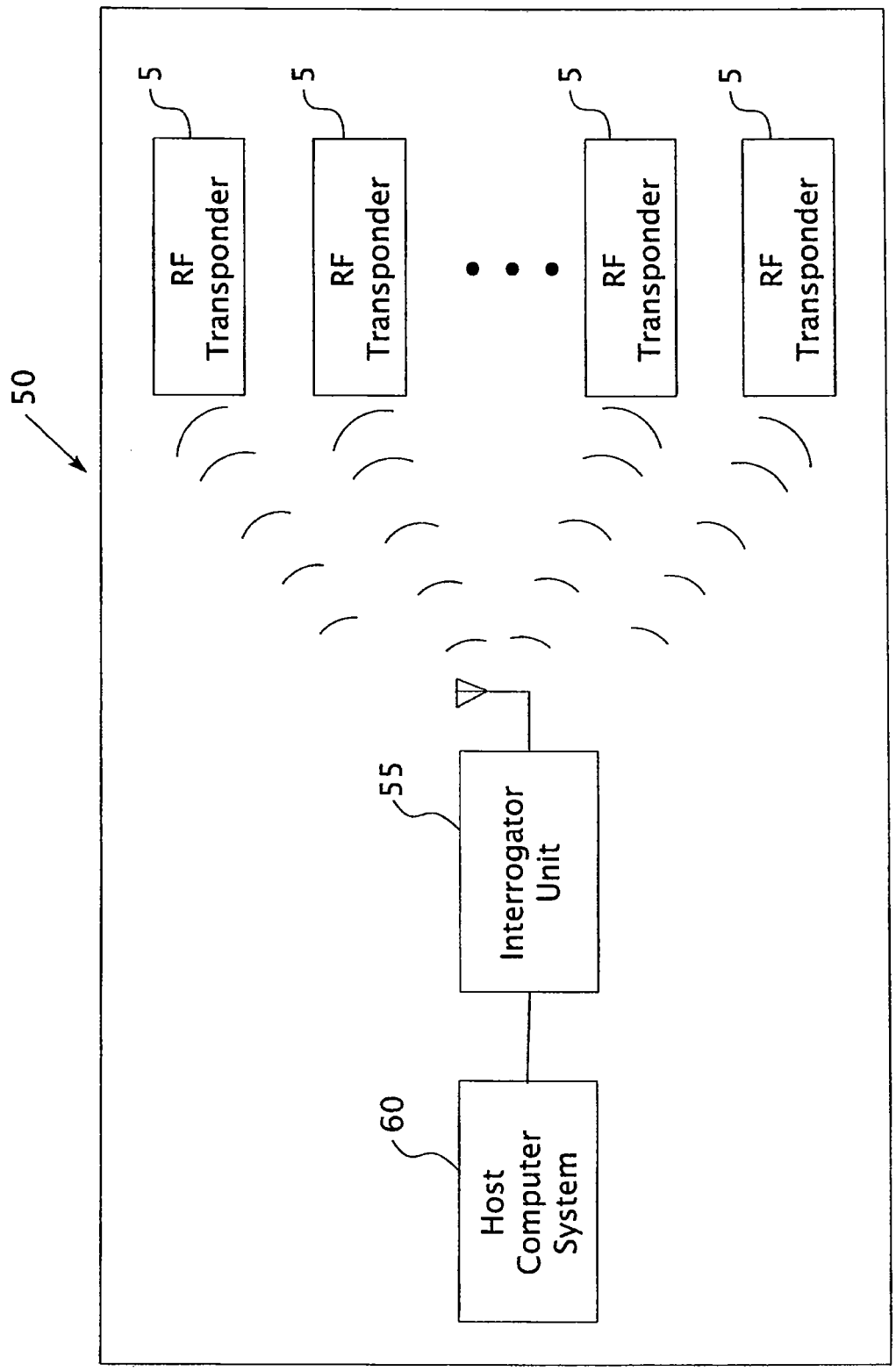
FIG. 2 is a block diagram of a system, such as an RFID system, that utilizes a plurality of RF transponders as described herein.

The RF transponder 5 is particularly adapted to be utilized in a transponder system 50, as shown in FIG. 2, wherein a plurality of similarly structured RF transponders 5 are deployed in a particular location, such as within a building. The transponder system 50 further includes an interrogator unit 55 which is in electronic communication with a host (central) computer system 60. Under the control of the host computer system 60, the interrogator unit 55 generates the RF signals that are required to selectively awaken the RF transponders 5 in the manner described below. In addition, for reasons to be described below, each of the RF transponders 5 is assigned at least one identifier, such as a unique identification number, that allows the RF transponder 5 to be selectively identified. That identifier is stored by the buffer device 20 in each transponder device 5. Each RF transponder 5 may, in one embodiment, have a unique identifier that uniquely identifies the RF transponder 5 in the system 50. Alternatively or additionally, one or more RF transponders 5 may share a common identifier so that they may be grouped and identified together.

In operation, each of the RF transponders 5, in one embodiment, is deployed in a state wherein the receiver 10 and the buffer device 20 thereof are active, meaning they are drawing current from the associated battery 40 at a level that allows them to be fully functional. In addition, the processing unit 25 and the transmitter 30 of each RF transponder 5 are, in this embodiment, in the inactive, sleep state. As such, the extent to which they draw power from the associated battery 40 will be at a minimum. When it is desired to "wake-up" a particular RF transponder 5, such as when it is desired to obtain information from the RF transponder 5, an RF information signal of an appropriate frequency that includes, without limitation, the particular identifier assigned to the RF transponder 5 of interest and any appropriate commands is generated by the interrogator unit 55 and transmitted to each RF transponder 5 in the system 50. The information just described may be included in the RF information signal by any known technique, such as a known modulation technique like frequency shift keying (FSK) or amplitude shift keying (ASK). The RF information signal is received by the receiver 10 of each RF transponder 5, where it is demodulated to obtain a corresponding information (digital) signal. The information signal, which includes the identifier and other information such as one or more commands, is then provided to the buffer device 20 of each RF transponder 5.

The buffer device 20 of each RF transponder 5 receives the information signal and compares the identifier included within the information signal to the identifier that is stored in the buffer device 20. In each case, if the buffer device 20 determines that the received identifier does not match a stored identifier, then no further action is taken. In the case or cases where the buffer device 20 of a transponder 5 determines that the two identifiers do match, the buffer device 20 generates a DC wake-up signal and provides the DC wake-up signal to the sleep input (pin) of the associated processing unit 25. The DC wake-up signal causes the processing unit 25 to move from the inactive, sleep state to its active state. Once the processing unit 25 has moved to the active state, the buffer device 20 will then provide the other information, such as one or more commands, based on data included in the information signal received from the associated receiver 10 to the processing unit 25. In the active state, the processing unit 25 is able to perform any action that is required by the received commands, such as waking up the associated RF transmitter 30 and causing it to transmit an information signal to the interrogator unit 55. When finished (or after some predetermined period of time), the processing unit 25 can return to an inactive, sleep state until subsequently woken up as described herein. The buffer device 20 may be any type of device that includes electronic circuitry for performing the functionality just described. For example, the buffer device 20 may be a PICFXX8 flash microcontroller sold by Microchip Technology Inc. of Chandler Arizona or a custom designed electronic circuit, such as a custom CMOS circuit.

Thus, as will be appreciated, the system 5 provides improved performance by maximizing the life of the batteries 40 included in the RF transponders 5 by awakening the processing units 25 of only the one or more RF transponders 5 for which an information signal generated by the interrogator unit 55 is intended.

In an alternative embodiment of the RF transponder 5, the buffer device 20 is capable of being placed into an inactive, sleep state where the current drawn by it is at a minimum, and may be woken up, i.e., moved from the inactive, sleep state to an active state, upon receipt of an external input signal. The receiver 10 in this alternative embodiment of the RF transponder 5 is adapted to generate a wake-up signal for the buffer device 20 when it receives a information signal as described above. Thus, in operation, the buffer device 20 in this embodiment will remain in a low power sleep state until the information signal is received by the receiver 10, at which time it will be awakened to perform the comparison described above. As a result, less power will be continuously consumed by the RF transponder 5 in this embodiment.

Figure 3:
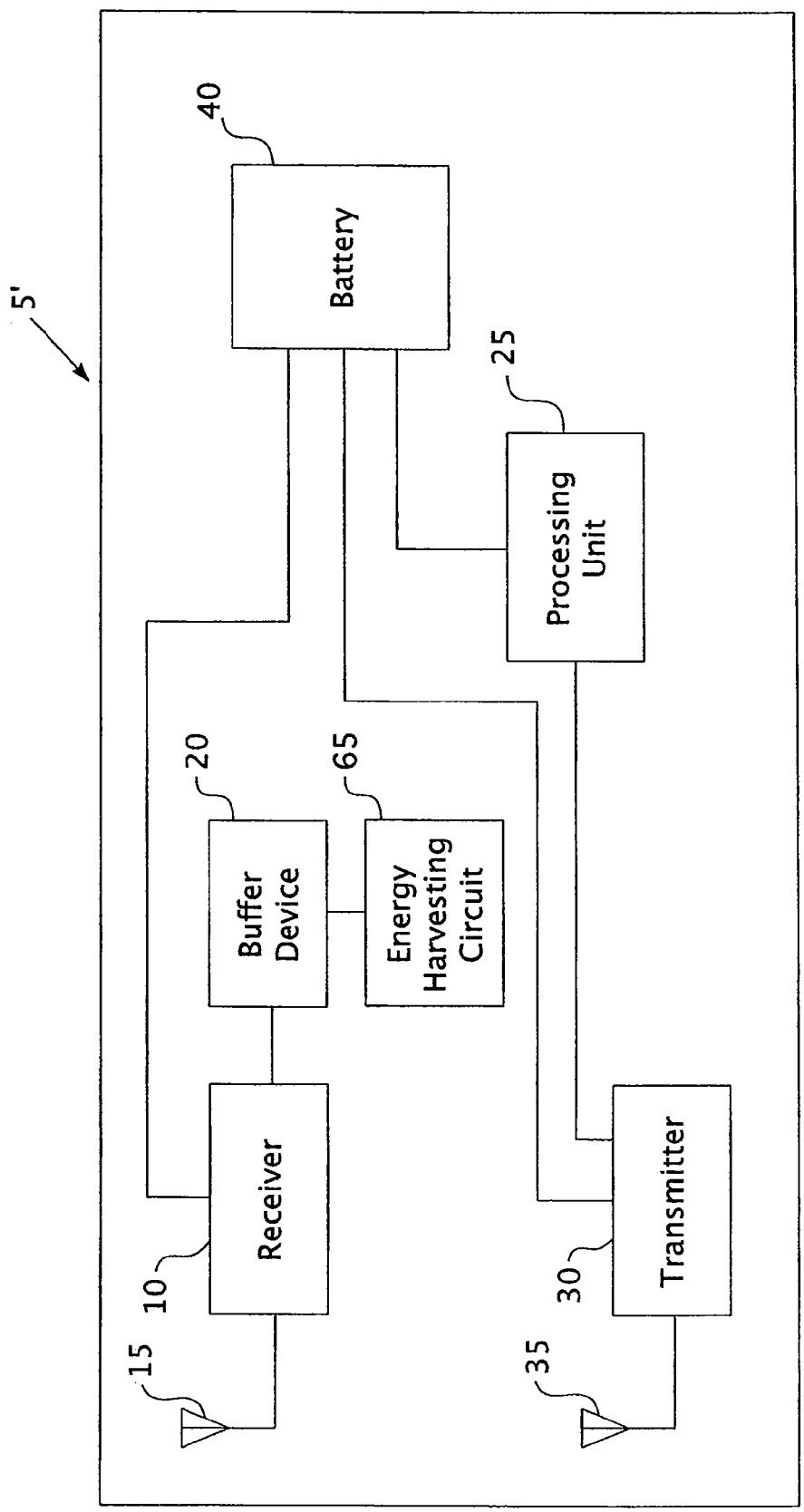
FIG. 3 is a block diagram of an RF transponder according to an alternative embodiment of the present invention.

FIG. 3 is a block diagram of an RF transponder 5' according to an alternative embodiment of the present invention. The RF transponder 5' is similar in operation to the RF transponder 5 shown in FIG. 1 and may be substituted for the RF transponder 5 in the system 50 shown in FIG. 2. Like the RF transponder 5, the RF transponder 5' includes a receiver 10, an antenna 15, a buffer device 20, a processing unit 25, a transmitter 30, an antenna 35 and a battery 40 which function as described in connection with FIG. 1. The RF transponder 5' differs from the RF transponder 5, however, in that instead of having a buffer device 20 that is operatively coupled to and continuously powered by the battery 40, the buffer device 20 receives operational power from an energy harvesting circuit 65 that harvests energy that is transmitted in space. As employed herein, the term "in space" means that energy or signals are being transmitted through the air or similar medium regardless of whether the transmission is within or partially within an enclosure, as contrasted with transmission of electrical energy by a hard wired or printed circuit boards. A number of methods and apparatus for harvesting energy from space and using the harvested energy to power an electronic device are described in U.S. Pat. No. 6,289,237, entitled "Apparatus for Energizing a Remote Station and Related Method," U.S. Pat. No. 6,615,074, entitled "Apparatus for Energizing a Remote Station and Related Method," U.S. Pat. No. 6,856,291, entitled "Energy Harvesting Circuits and Associated Methods," and United States Patent Application Publication No. 2005/0030181, entitled "Antenna on a Wireless Untethered Device such as a Chip or Printed Circuit Board for Harvesting Energy from Space," each assigned to the assignee hereof, the disclosures of which are incorporated herein by reference.

Figure 4:
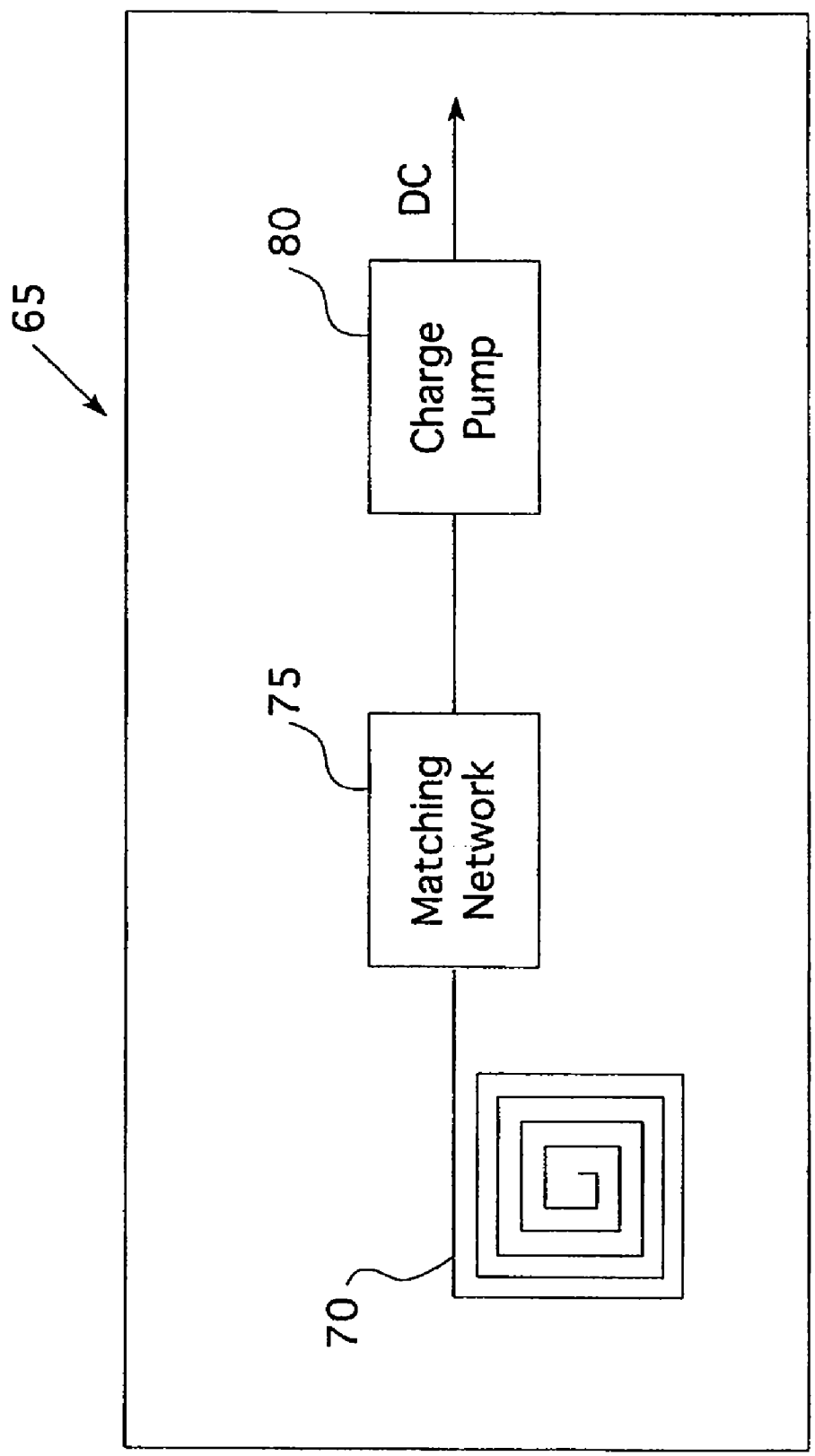
FIG. 4 is a block diagram of a preferred energy harvesting circuit used by certain of the RF transponder embodiments described herein.

The preferred energy harvesting circuit 65 is shown in FIG. 4 and includes an antenna 70, which may be, without limitation, a square spiral antenna. The antenna 70 is electrically connected to a matching network 75, which in turn is electrically connected to a voltage boosting and rectifying circuit in the form of a charge pump 80. Charge pumps are well known in the art. Basically, one stage of a charge pump essentially doubles the effective amplitude of an AC input voltage and stores the resulting increased DC voltage on an output capacitor. The voltage could also be stored using a rechargeable battery. Successive stages of a charge pump, if present, will essentially increase the voltage from the previous stage resulting in an increased output voltage. In operation, the antenna 70 receives energy, such as RF energy, that is transmitted in space by a far-field source, such as an RF source. The RF source may be, for example, the interrogator unit 55, in which case the RF energy may be the information signal transmitted by the interrogator unit 55, or a local radio station, in which case the RF energy comprises ambient RF energy in the vicinity of the RF transponder 5'. The RF energy received by the antenna 70 is provided, in the form of an AC signal, to the charge pump 80 through the matching network 75. The charge pump 80 amplifies and rectifies the received AC signal to produce a DC signal. The matching network 75 preferably matches the impedance of the charge pump 80 to the impedance of the antenna 70 in a manner that optimizes the amount of energy that is harvested (i.e., maximum DC output). In one particular embodiment, the matching network 75 is an LC tank circuit formed by the inherent distributed inductance and inherent distributed capacitance of the conducing elements of the antenna 70. Such an LC tank circuit has a non-zero resistance R which results in the retransmission of some of the incident RF energy. This retransmission of energy may cause the effective area of the antenna 70 to be greater than the physical area of the antenna 70. The DC signal generated by the charge pump 80 is provided to the buffer device 20 provided in the RF transponder 5' for powering the buffer device 20. Thus, the buffer device 20 in the RF transponder 5' is able to be powered remotely without the need, as in the case of the RF transponder 5, to continuously consume power from the battery 40. As will be appreciated, this is advantageous in that it further extends the life of the RF transponder 5' by further minimizing consumption of power from the battery 40.

Figure 5:
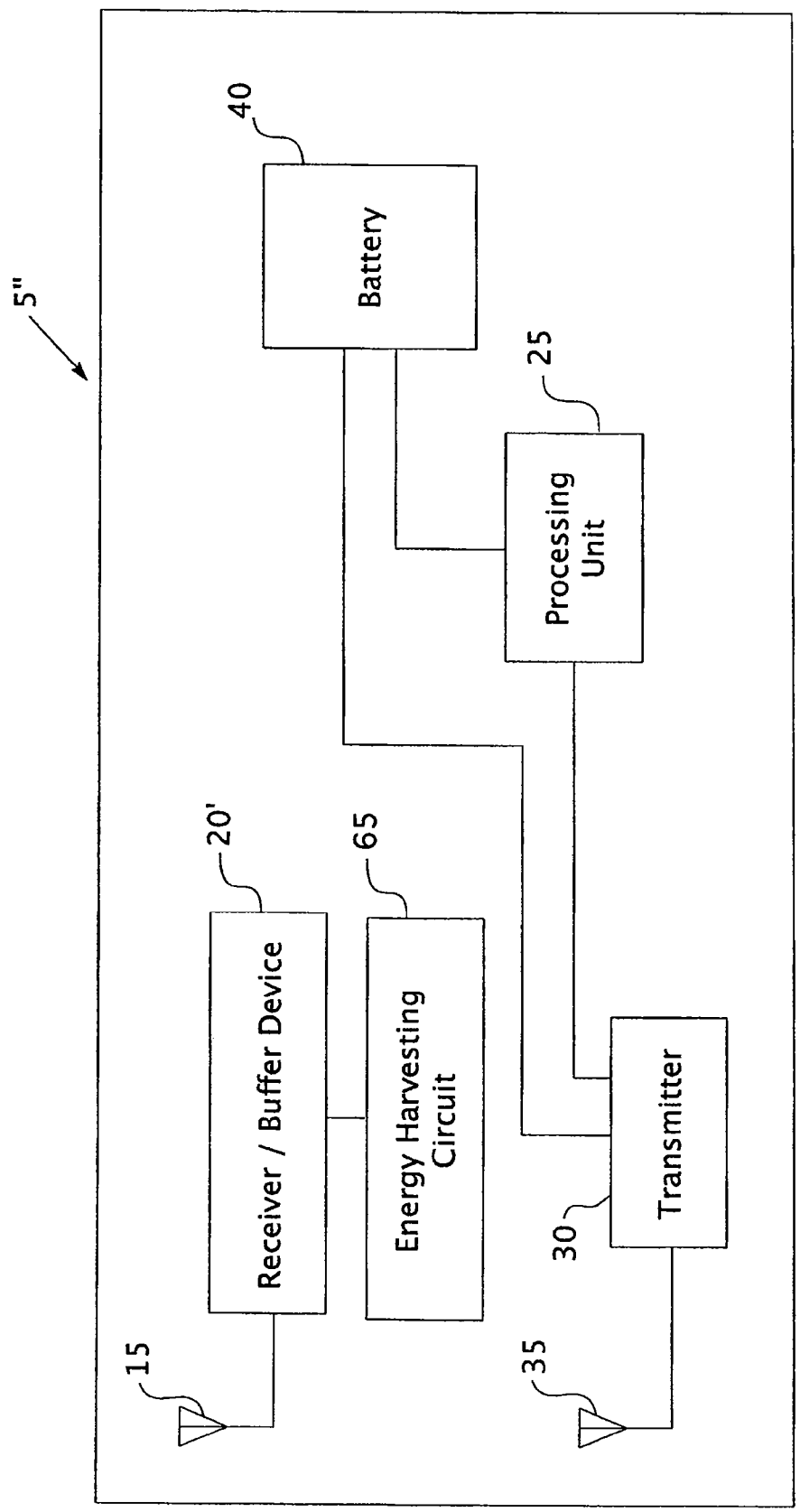
FIG. 5 is a block diagram of an RF transponder according to a further alternative embodiment of the present invention.

FIG. 5 is a block diagram of an RF transponder 5" according to a further alternative embodiment of the present invention. The RF transponder 5" is similar in operation to the RF transponder 5 shown in FIG. 1 and the RF transponder 5' shown in FIG. 3 and may be substituted for the RF transponder 5 or the RF transponder 5' in the system 50 shown in FIG. 2. Like the RF transponder 5, the RF transponder 5" includes an antenna 15, a processing unit 25, a transmitter 30, an antenna 35 and a battery 40 which function as described in connection with FIG. 1. The RF transponder 5" differs from the RF transponder 5 in that instead of having a receiver 10 and a buffer device 20 that are operatively coupled to and continuously powered by the battery 40, it includes a combination receiver/buffer device 20' that combines the functionality of the receiver 10 and the buffer device 20 described elsewhere herein in a single device. The receiver/buffer device 20' receives operational power from an energy harvesting circuit 65 that harvests energy that is transmitted in space. As will be appreciated, this configuration is advantageous in that it still further extends the life of the RF transponder 5" by even further minimizing the consumption of power from the battery 40.

Figure 6:
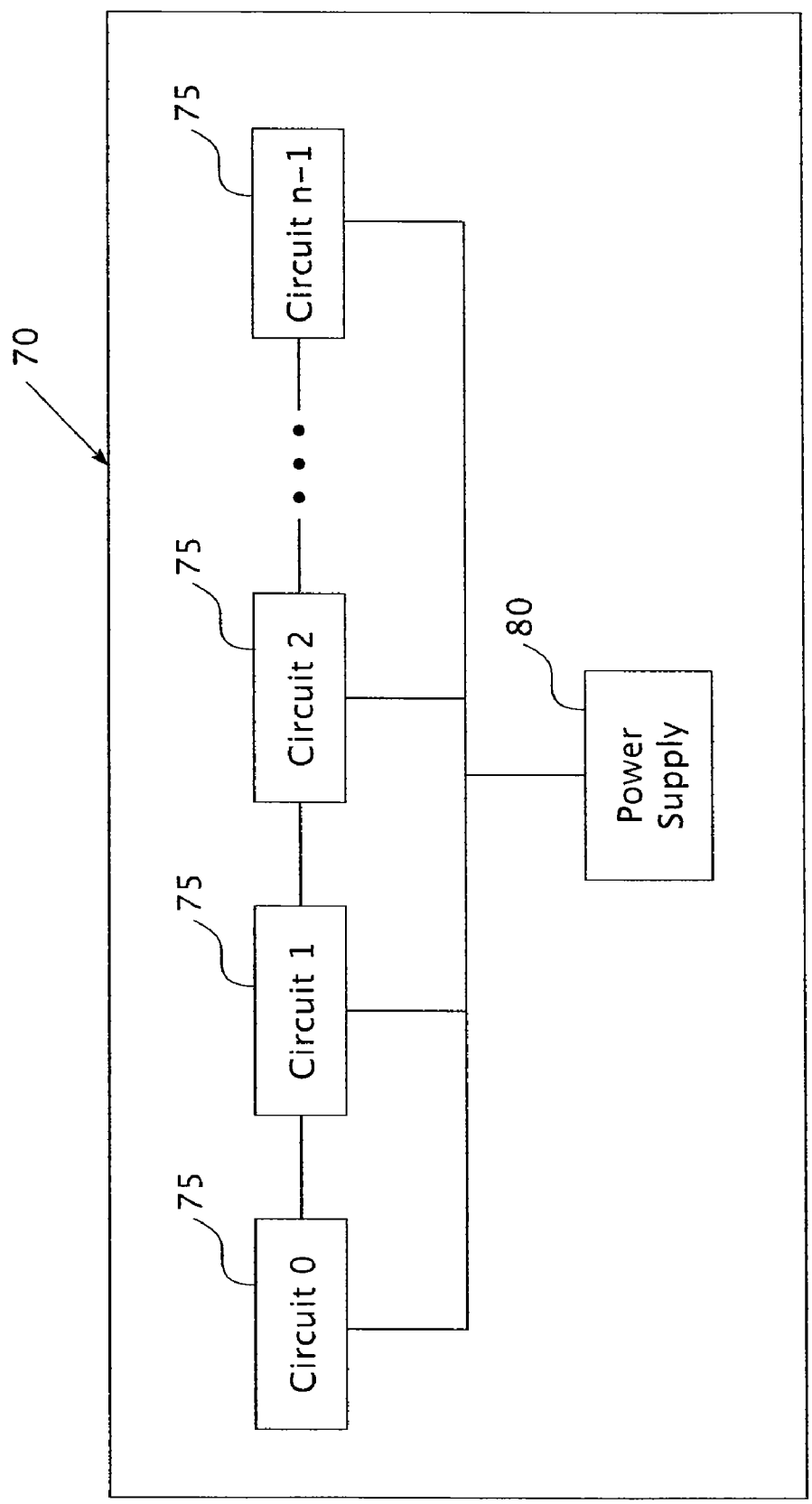
FIG. 6 is a schematic representation of a transponder according to another embodiment of the present invention.

FIG. 6 is a schematic representation of a transponder 70 according to another embodiment of the present invention. The transponder 70 includes n circuits 75 (labeled circuit 0 through circuit n−1 in FIG. 6), each of which is connected to a source of power, such as a single power supply 80 (e.g., a battery, fuel cell or supercapacitor) as shown in FIG. 6, or alternatively, any one of multiple power supplies provided as part of transponder 70. Each circuit 75 may be, without limitation, an integrated circuit chip or other electronic device. For example, and without limitation, each circuit 75 may an RF receiver, an RF transmitter, a 30 KHz tone circuit, a buffer device (as described elsewhere herein), a custom integrated circuit (e.g., a custom CMOS circuit), or a processing unit such as a microprocessor or microcontroller, among other devices. In addition, each circuit 75 has a power requirement $p(i)$ which represents the power that is required/consumed during operation of the particular circuit 75. In the transponder 70, $p(0)<p(1)<p(2)< \ldots <p(n-1)$, or put another way, $p(i-1)<p(i)$. As such, the $n^{th}$ circuit 75 (labeled circuit n−1), which may be, for example, a processing unit, has the highest power requirement and the $1^{st}$ circuit 75 (labeled circuit 0) has the lowest power requirement. Also, as seen in FIG. 6, the circuits 75 are connected to one another in a sequence that corresponds to their respective power levels, meaning that circuit 0 is connected to circuit 1, circuit 1 is connected to circuit 2, and so on. Furthermore, each circuit 75 may be provided on a separate substrate or die, or, alternatively, one or more (or all) of the circuits 75 may be provided on the same (common) substrate or die. Finally, at least each of the circuits 75 after circuit 0 in the sequence is capable of being placed into an inactive, sleep state where the current drawn by it is at a minimum, and is able to be woken up, i.e., moved from the inactive, sleep state to an active state, upon receipt of an input signal (a wake-up signal). Preferably, the $1^{st}$ circuit 75 (labeled circuit 0) remains in an active state at all times to be able to receive incoming signals from a reader device, such as the interrogator unit 55 shown in FIG. 2, although it is possible for the $1^{st}$ circuit 75 (labeled circuit 0) to also be capable of moving from an inactive, sleep state to an active state upon receipt of an input (wake-up) signal.

According to this embodiment of the invention, the objective is to awaken each circuit 75 in the sequence 0, 1, 2, . . ., n−1 only as necessary. In particular, in response to receiving an inquiry signal from a reader device, such as the interrogator unit 55 shown in FIG. 2, a wake up signal is only given to the next highest circuit 75 if it is determined by the current circuit 75 that the inquiry signal may be intended for/require the operation of the next circuit 75 or greater in the sequence. Thus, through this sequence of increasing power circuits 75, only that power that is necessary is actually consumed (as opposed to unnecessarily awakening higher power circuits 75 which are not required for processing the inquiry signal). Also, as the $i^{th}$ circuit 75 in the sequence is awakened, the $i^{th}-1$ circuit 75 in the sequence may be caused to move back to an inactive state, such as in response to the logic of the circuit or in response to a command received from the reader device as part of a protocol. As a result, the transponder 70, including the circuits 75, implements a power optimized ladder architecture.

Figure 7:
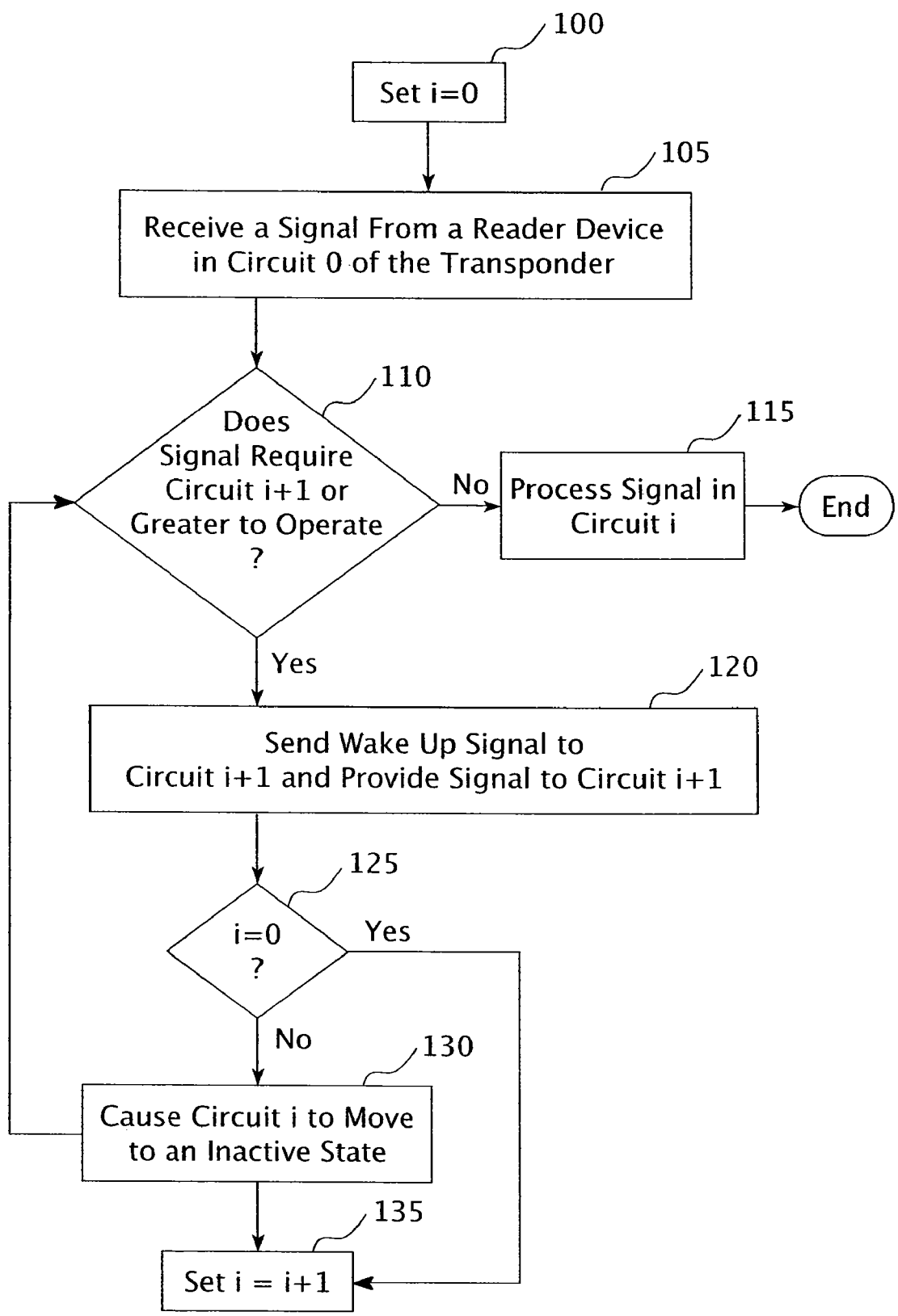
FIG. 7 is a flowchart of a method for managing power consumption in the transponder of FIG. 6 according to a preferred embodiment of the invention.

FIG. 7 is a flowchart of a method for managing power consumption in the transponder 70 (based on the power optimized ladder architecture described above) according to a preferred embodiment of the invention. The method begins at step 100, wherein a counter I is et to zero. Next, at step 105, a signal from a reader device, such as the interrogator unit 55 shown in FIG. 2, is received in the circuit 75 labeled as circuit 0 (this circuit 75 may be, for example, an RF transmitter or a 30 KHz tone receiving circuit). Next, at step 110, the circuit 75 labeled as circuit i (which initially is circuit 0) makes a determination, based on information included in the received signal, as to whether the received signal requires the circuit 75 labeled as circuit i+1 or higher to operate (i.e., process the signal). If the answer at step 110 is no, then, at step 115, the received signal is processed in the circuit 75 labeled as circuit i. If, however, the answer at step 110 is yes, then, at step 120, the circuit 75 labeled as circuit i sends a wake-up signal to the circuit 75 labeled as circuit i+1 and provides the received signal to the circuit 75 labeled as circuit i+1. Next, at step 125, a determination is made as to whether the counter i equals zero. If the answer at step 125 is no, then, at step 130, the circuit 75 labeled as circuit i is caused to move to an inactive state. Then, at step 135, the counter i is set equal to i+1. If, however, the answer at step 125 is yes, then the method proceeds directly to step 135. Following step 135, the method returns to step 110 for further processing as described herein.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method of managing power consumption in a transponder having a plurality of circuits including at least a first circuit having a first active state requiring at least a first level of power, and a second circuit having a second active state requiring at least a second level of power, wherein said second level of power is greater than said first level of power, the method comprising:

receiving a reader signal sent by a reader device in said first circuit;

determining in said first circuit, based on information included in said reader signal, whether said reader signal requires one of said plurality of circuits other than said first circuit to operate; and causing said first circuit to provide a wake-up signal to said second circuit and causing said first circuit to provide said reader signal to said second circuit if it is determined that said reader signal requires one of said plurality of circuits other than said first circuit to operate, said wake-up signal causing said second circuit to move from an inactive state to said second active state.

2. The method according to claim 1, wherein said plurality of circuits further includes a third circuit having a third active state requiring at least a third level of power, wherein said third level of power is greater than said second level of power, and wherein said method further comprises:

determining in said second circuit, based on said information included in said reader signal, whether said reader signal requires one of said plurality of circuits other than said second circuit to operate; and causing said second circuit to provide a second wake-up signal to said third circuit and causing said second circuit to provide said reader signal to said third circuit if it is determined that said reader signal requires one of said plurality of circuits other than said second circuit to operate, said second wake-up signal causing said third circuit to move from an inactive state to said third active state.

3. The method according to claim 1, wherein said first and second circuits are provided on a single die.

4. The method according to claim 1, wherein said first and second circuits are provided on separate dies.

5. The method according to claim 1, wherein said reader signal is an RF signal.

6. The method according to claim 2, wherein said third circuit is a processor.

7. The method according to claim 2, further comprising causing said second circuit to move back to said inactive state after said step of causing said second circuit to provide a second wake-up signal to said third circuit and causing said second circuit to provide said reader signal to said third circuit.

8. The method according to claim 1, wherein said plurality of circuits further includes a third circuit having a third active state requiring at least a third level of power, wherein said third level of power is less than said first level of power, the method further comprising, prior to said receiving step:

receiving said reader signal in said third circuit;

causing said third circuit to provide a second wake-up signal to said first circuit in response to receipt of said reader signal, said second wake-up signal causing said first circuit to move from an inactive state to said first active state; and causing said third circuit to provide said reader signal to said first circuit.

9. A transponder apparatus, comprising:

a plurality of circuits including at least a first circuit having a first active state requiring at least a first level of power, and a second circuit having a second active state requiring at least a second level of power, wherein said second level of power is greater than said first level of power;

wherein said first circuit is structured to: (i) receive a reader signal sent by a reader device, (ii) determine, based on information included in said reader signal, whether said reader signal requires one of said plurality of circuits other than said first circuit to operate, and (iii) provide a wake-up signal to said second circuit and provide said reader signal to said second circuit if it is determined that said reader signal requires one of said plurality of circuits other than said first circuit to operate, said wake-up signal causing said second circuit to move from an inactive state to said second active state.

10. The transponder apparatus according to claim 9, wherein said plurality of circuits further includes a third circuit having a third active state requiring at least a third level of power, wherein said third level of power is greater than said second level of power, and wherein said second circuit is structured to: (i) determine, based on said information included in said reader signal, whether said reader signal requires one of said plurality of circuits other than said second circuit to operate, and (ii) provide a second wake-up signal to said third circuit and provide said reader signal to said third circuit if it is determined that said reader signal requires one of said plurality of circuits other than said second circuit to operate, said second wake-up signal causing said third circuit to move from an inactive state to said third active state.

11. The transponder apparatus according to claim 9, wherein said first and second circuits are provided on a single die.

12. The transponder apparatus according to claim 9, wherein said first and second circuits are provided on separate dies.

13. The transponder apparatus according to claim 9, wherein said reader signal is an RF signal.

14. The transponder apparatus according to claim 10, wherein said third circuit is a processor.

15. The transponder apparatus according to claim 10, wherein said second circuit is structured to move back to said inactive state after providing said second wake-up signal to said third and providing said reader signal to said third circuit.

16. The transponder apparatus according to claim 9, wherein said plurality of circuits further includes a third circuit having a third active state requiring at least a third level of power, wherein said third level of power is less than said first level of power, wherein said third circuit is structured to: (i) receive said reader signal, (ii) provide a second wake-up signal to said first circuit in response to receipt of said reader signal, said second wake-up signal causing said first circuit to move from an inactive state to said first active state, and (iii) provide said reader signal to said first circuit.

* * * * *

UNITED STATES PATENT AND TRADEMARK OFFICE
CERTIFICATE OF CORRECTION

PATENT NO. : 7,525,436 B2  
APPLICATION NO. : 11/561595  
DATED : April 28, 2009  
INVENTOR(S) : Marlin H. Mickle et al.

Page 1 of 1

It is certified that error appears in the above-identified patent and that said Letters Patent is hereby corrected as shown below:

Column 7, line 43, "a information" should be --an information--.  
Column 8, line 1, "printed circuit boards" should be --printed circuit board--.  
Column 9, line 21, "may an" should be --may be an--.  
Column 10, line 8, "is et" should be --is set--.  
Column 12, line 35, "said third and" should be --said third circuit and--.

Signed and Sealed this

Fourth Day of August, 2009

JOHN DOLL  
*Acting Director of the United States Patent and Trademark Office*